United States Patent
Suzuki et al.

(10) Patent No.: US 8,933,361 B2
(45) Date of Patent: Jan. 13, 2015

(54) MICROHOLE ELECTRIC DISCHARGE MACHINING APPARATUS AND ELECTRIC DISCHARGE MACHINING METHOD

(75) Inventors: Satoshi Suzuki, Chiyoda-ku (JP); Akihiro Goto, Chiyoda-ku (JP); Kazushi Nakamura, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 400 days.

(21) Appl. No.: 13/056,609

(22) PCT Filed: Jul. 29, 2008

(86) PCT No.: PCT/JP2008/063602
§ 371 (c)(1),
(2), (4) Date: Jan. 28, 2011

(87) PCT Pub. No.: WO2010/013315
PCT Pub. Date: Feb. 4, 2010

(65) Prior Publication Data
US 2011/0174783 A1    Jul. 21, 2011

(51) Int. Cl.
*B23H 1/04* (2006.01)
*B23H 9/14* (2006.01)
(Continued)

(52) U.S. Cl.
CPC .................. *B23H 9/14* (2013.01); *B23H 7/265* (2013.01); *B23H 7/28* (2013.01); *B23H 2200/20* (2013.01); *B23H 2400/10* (2013.01)
USPC .................................................... 219/69.15

(58) Field of Classification Search
USPC ................... 219/69.12–69.15, 69.12–69.17
See application file for complete search history.

(56) References Cited

U.S. PATENT DOCUMENTS 4,460,816 A * 7/1984 Bonga .......................... 219/69.12
4,629,854 A * 12/1986 Inoue et al. .................. 219/69.14
(Continued)

FOREIGN PATENT DOCUMENTS

CN       1489502 A      4/2004
DE   102004013549 A1   10/2005
(Continued)

OTHER PUBLICATIONS

Japanese Office Action dated Oct. 23, 2012, issued in corresponding Japanese Patent Application No. 2010-522549.
(Continued)

*Primary Examiner* — Dana Ross
*Assistant Examiner* — Renee L Miller
(74) *Attorney, Agent, or Firm* — Sughrue Mion, PLLC; Richard C. Turner (57) ABSTRACT

A microhole electric discharge machining apparatus that forms a conical inverse-tapered hole on a workpiece by a thin wire electrode, includes, an electrode holder that holds an upper part of the thin wire electrode and feeds a lower part of the thin wire electrode downward to stretch the lower part to the workpiece by rotating the thin wire electrode; a first guide member that is arranged near the workpiece upper surface and is provided with a first guide hole through which the thin wire electrode is penetrated on a hole-machining axis; a second guide member that is arranged between the first guide member and the electrode holder and is provided with a second guide hole through which the thin wire electrode is penetrated at a position eccentric from the hole-machining axis; and a swivel driving unit that circularly swivels the second guide member around the hole-machining axis.

21 Claims, 9 Drawing Sheets

(51) Int. Cl.
*B23H 7/26* (2006.01)
*B23H 7/28* (2006.01)

(56) References Cited

U.S. PATENT DOCUMENTS

| | | | |
|---|---|---|---|
| 4,751,362 A | 6/1988 | Girardin | |
| 4,814,574 A * | 3/1989 | Babel et al. | 219/69.12 |
| 4,945,200 A * | 7/1990 | Truty et al. | 219/69.12 |
| 5,444,204 A * | 8/1995 | Derighetti et al. | 219/69.11 |
| 5,585,013 A * | 12/1996 | Truty | 219/69.12 |
| 5,973,288 A * | 10/1999 | Marchesi et al. | 219/69.13 |
| 6,127,642 A * | 10/2000 | Gleason et al. | 219/69.15 |
| 6,211,480 B1 * | 4/2001 | Nagata | 219/69.11 |
| 6,576,858 B1 * | 6/2003 | Yokomichi | 219/69.2 |
| 6,717,094 B2 * | 4/2004 | Beaumont | 219/69.14 |
| 7,009,134 B2 * | 3/2006 | Aurich et al. | 219/69.15 |
| 7,202,439 B2 * | 4/2007 | Ishiwata et al. | 219/69.14 |
| 7,214,901 B1 * | 5/2007 | Ball et al. | 219/69.17 |
| 7,329,825 B2 * | 2/2008 | Awakura | 219/69.15 |
| 2003/0038117 A1 | 2/2003 | Pickel et al. | |
| 2004/0056004 A1 | 3/2004 | Aurich et al. | |
| 2005/0061682 A1 | 3/2005 | Lukic | |
| 2006/0231530 A1 * | 10/2006 | Beaumont et al. | 219/69.15 |
| 2007/0102402 A1 * | 5/2007 | Miyake et al. | 219/69.15 |
| 2008/0283504 A1 | 11/2008 | MacGregor | |

FOREIGN PATENT DOCUMENTS

| | | |
|---|---|---|
| EP | 1541271 A2 | 6/2005 |
| JP | 53-132894 A | 11/1978 |
| JP | 55-058922 A | 5/1980 |
| JP | 55-120929 A | 9/1980 |
| JP | 57-501669 A | 9/1982 |
| JP | 61-265215 A | 11/1986 |
| JP | 2003-117734 A | 4/2003 |
| JP | 2004-501786 A | 1/2004 |
| JP | 2005-532914 A | 11/2005 |
| JP | 2007-263114 A | 10/2007 |
| JP | 2010-017809 A | 1/2010 |
| WO | 8201495 A1 | 5/1982 |
| WO | 02/02266 A1 | 1/2002 |

OTHER PUBLICATIONS

Chinese Office Action, dated Aug. 30, 2012.
Japanese Office Action, Application No. 2010-522549, Dec. 4, 2012.

* cited by examiner

MACHINING RESULT

| TEST | ECCENTRICITY AMOUNT OF SECOND GUIDE [mm] | INPUT DIAMETER [φ mm] | OUTPUT DIAMETER [φ mm] |
|---|---|---|---|
| 1 | 0.1 | 0.0939 | 0.135 |
| 2 | 0.2 | 0.1075 | 0.1624 |
| 3 | 0.3 | 0.1213 | 0.2025 |

MICROHOLE ELECTRIC DISCHARGE MACHINING APPARATUS AND ELECTRIC DISCHARGE MACHINING METHOD

TECHNICAL FIELD

The present invention relates to a microhole electric discharge machining apparatus and an electric discharge machining method.

BACKGROUND ART

Conventionally, when performing hole-machining on a workpiece with a thin-wire bar-shaped or pipe-shaped electrode, what can be formed is only a straight hole having approximately the same hole diameters on both an upper surface and a lower surface of the workpiece, or a tapered hole having a larger hole diameter on the upper surface than that on the lower surface. As an electric discharge machining apparatus that forms a conical inverse-tapered hole having a larger hole diameter on a lower surface than that on an upper surface of a workpiece, there has been proposed an electric discharge machining apparatus that forms with a rod-shaped electrode on a workpiece a conical inverse-tapered hole having a larger hole diameter on a lower surface than that on an upper surface of the workpiece, where the machine includes a roller that feeds the electrode downward to stretch a lower part of the electrode to the workpiece, a lower guide that is arranged near the upper surface of the workpiece and is provided with a guide hole through which the electrode is penetrated, an upper guide that is arranged between the lower guide and the roller and is provided with a guide hole through which the electrode is penetrated, and a magnetic field positioned between the lower guide and the upper guide and directed to a direction perpendicular to the electrode formed by a magnet, thereby forming an inverse-tapered hole on the workpiece by rotating a free end of the electrode by passing a current changing along a time to the electrode and by causing the electrode to work rotating Lorentz force by rotating the magnetic field (for example, see Patent Document 1).

Patent Document 1: Japanese Patent Application Laid-open No. 2007-2263114 (Page 6, FIG. 2)

DISCLOSURE OF INVENTION

Problem to be Solved by the Invention

However, according to a conventional technique described in Patent Document 1, the current passed to the electrode and the magnetic field applied between the two guides need to be large to some extent to elastically deform the electrode by applying the magnetic field between the two guides. Meanwhile, the current flowing to the electrode always changes depending on an electric discharge state, and also changes depending on a set current condition. Therefore, a taper angle of the inverse-tapered hole varies and there is a problem that it is difficult to perform inverse-tapered hole machining in high precision.

To elastically deform the electrode between the two guides in a secure manner, the distance between the guides needs to be long (about 30 to 50 millimeters, for example). To elastically deform the electrode in a secure manner even when a machining current that flows to the electrode is small, the distance between the guides needs to be longer. There is a problem that a portion of the length of the two guides and the distance between the two guides cannot be used for electric discharge by inserting the electrode into the workpiece, and this portion becomes wasteful and increases the cost of electrodes.

The present invention has been achieved in view of the above problems, and an object of the present invention is to provide a microhole electric discharge machining apparatus of which the cost of electrodes is low and that can form a high-precision inverse-tapered hole.

Means for Solving Problem

In order to solve above-mentioned problems and to achieve the object, the present invention provides a microhole electric discharge machining apparatus that forms on a workpiece by a thin wire electrode a conical inverse-tapered hole having a larger hole diameter on a lower surface than a hole diameter on a workpiece upper surface, the microhole electric discharge machining apparatus including: an electrode holder that holds an upper part of the thin wire electrode and feeds a lower part of the thin wire electrode downward to stretch the lower part to the workpiece by rotating the thin wire electrode; a first guide member that is arranged near the workpiece upper surface and is provided with a first guide hole through which the thin wire electrode is penetrated on a hole-machining axis; a second guide member that is arranged between the first guide member and the electrode holder and is provided with a second guide hole through which the thin wire electrode is penetrated at a position eccentric from the hole-machining axis; and a swivel driving unit that circularly swivels the second guide member around the hole-machining axis.

Effect of the Invention

According to the present invention, a microhole electric discharge machining apparatus of which the cost of electrodes is low and that can form a high-precision inverse-tapered hole can be obtained.

EXPLANATIONS OF LETTERS OR NUMERALS

11 Thin wire electrode
11b Lower part
12 Workpiece
12a Workpiece upper surface
12b Workpiece lower surface
12t, 82t Inverse-tapered hole
13 Electrode holder
14, 114 First guide member
14a, 114a First guide hole
15 Hole-machining axis
16, 26, 36, 56a, 56b, 216 Second guide member
16a, 26a, 36a, 56c, 56d, 116a, 216a Second guide hole
17, 87a Swivel driving unit
18, 218 Eccentricity-amount adjusting unit
40 Third guide member
40a Third guide hole
81, 82, 83, 84a, 84b, 85a, 85b, 86, 87, 88 Microhole electric discharge machining apparatus

BEST MODE(S) FOR CARRYING OUT THE INVENTION

Exemplary embodiments of a microhole electric discharge machining apparatus according to the present invention will be explained below in detail with reference to the accompanying drawings. The present invention is not limited thereto.

First Embodiment

Figure 1:
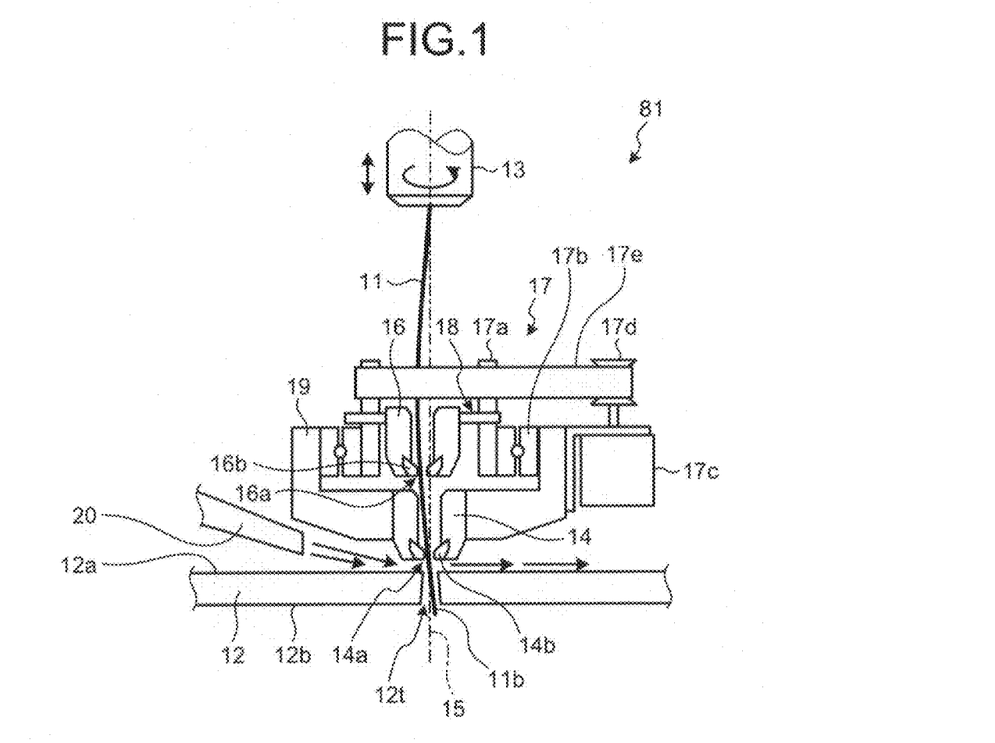
FIG. 1 is a vertical cross-sectional view of a microhole electric discharge machining apparatus according to a first embodiment of the present invention.
Figure 2:
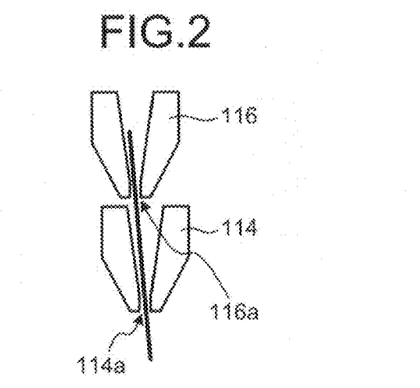
FIG. 2 is a vertical cross-sectional view of guide members of another mode.
Figure 3:
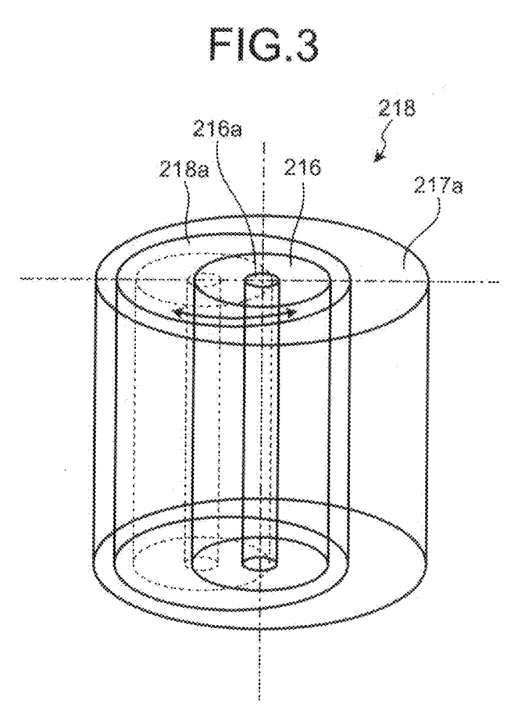
FIG. 3 is a perspective view of an eccentricity-amount adjusting unit of a variant of the first embodiment.
Figure 4:
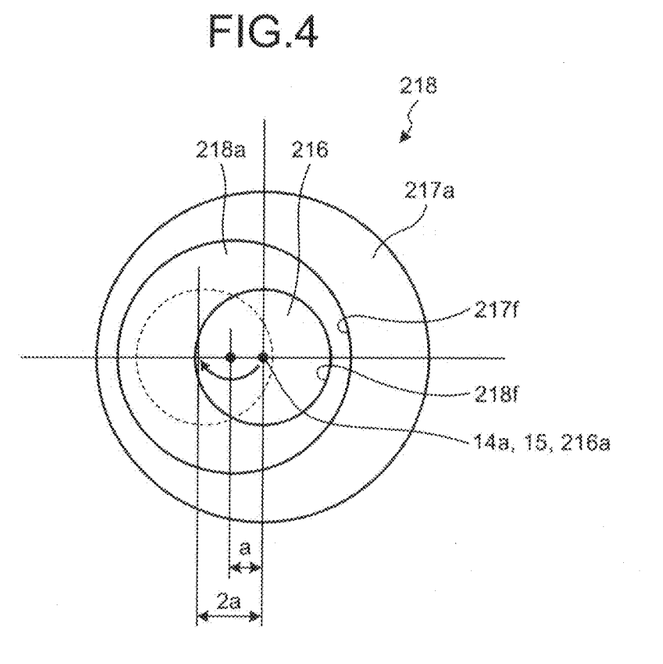
FIG. 4 is a plan view of the eccentricity-amount adjusting unit of the variant of the first embodiment.
Figure 5:
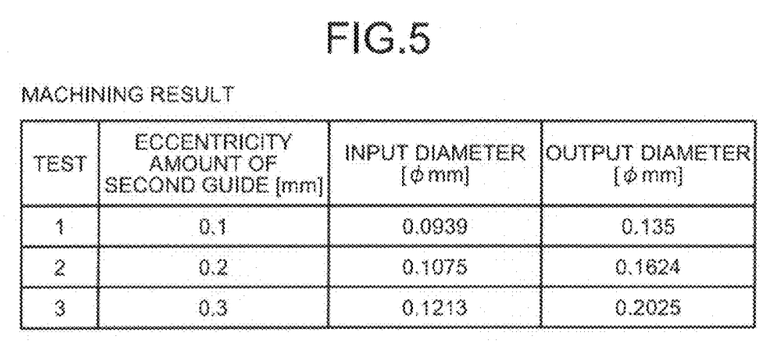
FIG. 5 is a table of an example of an inverse-tapered hole machined by the microhole electric discharge machining apparatus according to the first embodiment.
Figure 6:
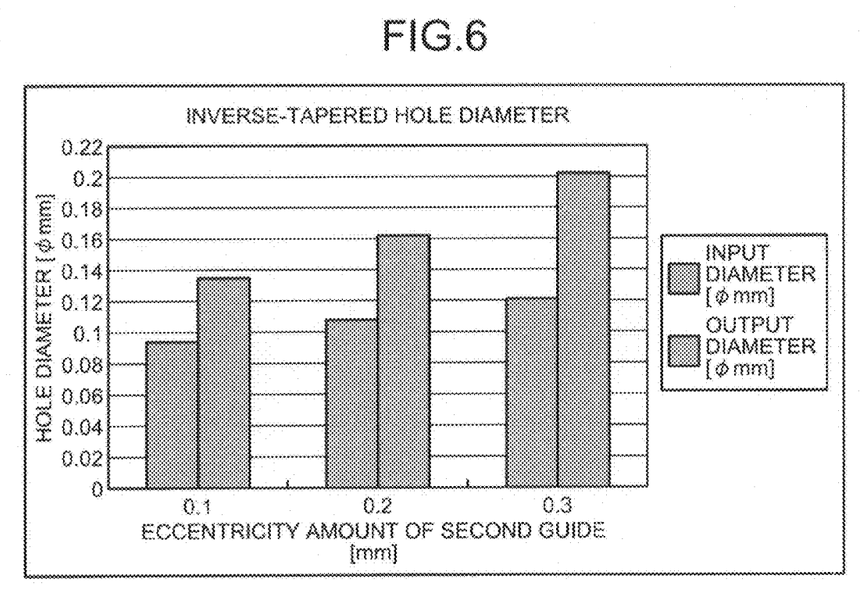
FIG. 6 is a bar graph of an example of the inverse-tapered hole machined by the microhole electric discharge machining apparatus according to the first embodiment.
Figure 7:
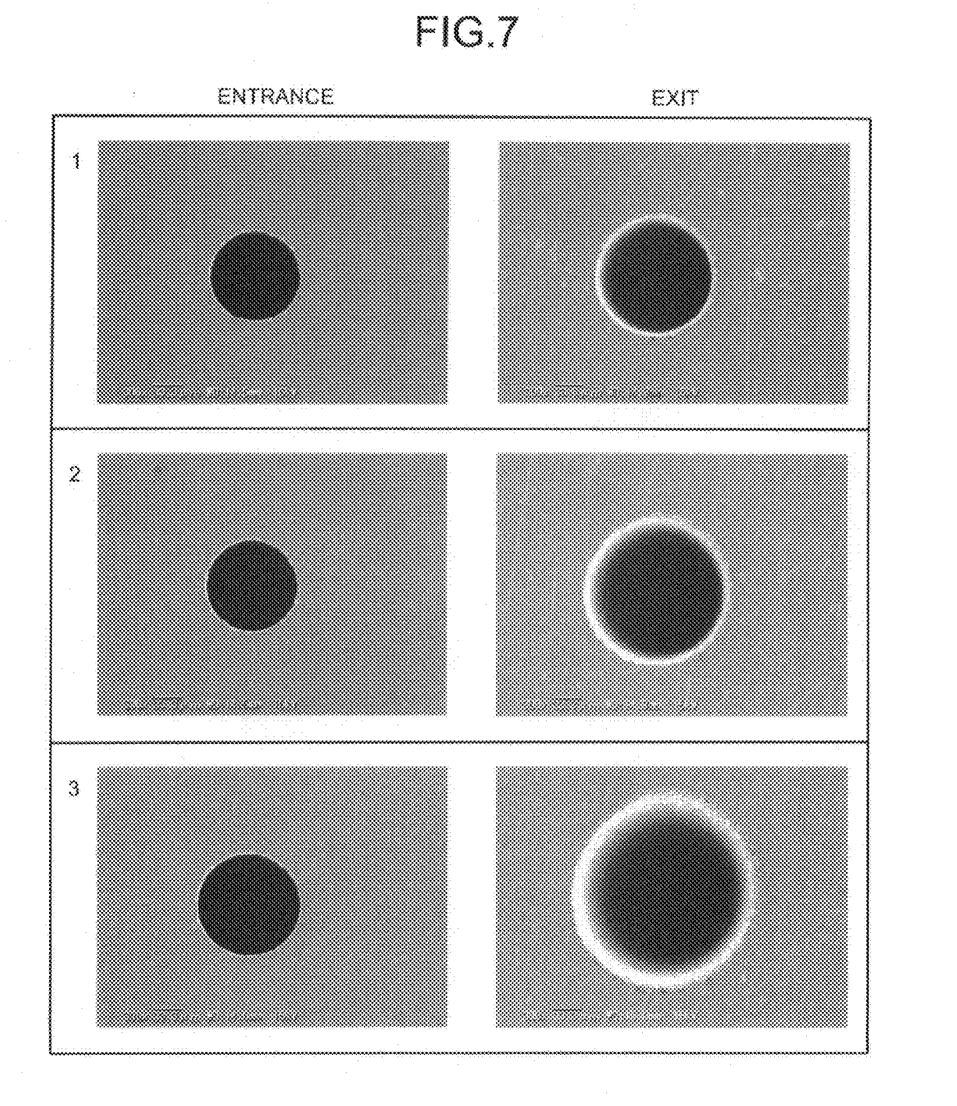
FIG. 7 is an enlarged photograph of an example of the inverse-tapered hole machined by the microhole electric discharge machining apparatus according to the first embodiment.

FIG. 1 is a vertical cross-sectional view of a microhole electric discharge machining apparatus according to a first embodiment of the present invention, FIG. 2 is a vertical cross-sectional view of guide members of another mode, FIG. 3 is a perspective view of an eccentricity-amount adjusting unit of a variant of the first embodiment, FIG. 4 is a plan view of the eccentricity-amount adjusting unit of the variant of the first embodiment, FIG. 5 is a table of an example of an inverse-tapered hole machined by the microhole electric discharge machining apparatus according to the first embodiment, FIG. 6 is a bar graph of an example of the inverse-tapered hole machined by the microhole electric discharge machining apparatus according to the first embodiment, and FIG. 7 is an enlarged photograph of an example of the inverse-tapered hole machined by the microhole electric discharge machining apparatus according to the first embodiment.

As shown in FIG. 1, a microhole electric discharge machining apparatus 81 according to the first embodiment includes: an electrode holder 13 that holds an upper part of a thin wire electrode 11 and feeds a lower part 11b downward to stretch the lower part 11b to a workpiece 12 by rotating the thin wire electrode 11; a first guide member 14 that is arranged near a workpiece upper surface 12a and is provided with a first guide hole 14a through which the thin wire electrode 11 is penetrated on a hole-machining axis 15; a second guide member 16 that is arranged between the first guide member 14 and the electrode holder 13 and is provided with a second guide hole 16a through which the thin wire electrode 11 is penetrated at a position eccentric from the hole-machining axis 15; and a swivel driving unit 17 that circularly swivels the second guide member 16 (the second guide hole 16a) around the hole-machining axis 15, thereby forming on the workpiece 12 a conical inverse-tapered hole 12t having a larger hole diameter on a lower surface 12b of the workpiece than a hole diameter on the workpiece upper surface 12a by conically swiveling the lower part 11b of the thin wire electrode 11.

The microhole electric discharge machining apparatus 81 also includes an eccentricity-amount adjusting units 18 that adjust an amount of eccentricity of the second guide hole 16a from the hole-machining axis 15, a nozzle 20 injecting a machining liquid to a machined part during electric discharge machining.

The thin wire electrode 11 is formed in a bar shape or a pipe shape. The electrode holder 13 is supported by a slide (not shown) of the electric discharge machining apparatus, and can freely move in upward and downward directions on the hole-machining axis 15 by rotating around the hole-machining axis 15 (rotation axis).

The first guide member 14 is supported by a guide base 19. The guide base 19 can move in upward and downward directions on the hole-machining axis 15 by a driving mechanism (not shown), and a lower end of the first guide member 14 (the first guide hole 14a) is fixed at a position separated from the workpiece upper surface 12a by about 0.1 to 1 millimeter.

The second guide member 16 is held by a guide holding cylinder 17a with the eccentricity-amount adjusting screws 18 as the eccentricity-amount adjusting units, and the guide holding cylinder 17a is rotatably supported by the guide base 19 with a bearing 17b. A rotation center of the bearing 17b is concentric with the first guide hole 14a and matches the hole-machining axis 15.

The second guide hole 16a is provided at a position eccentric from the first guide hole 14a (the hole-machining axis 15), and is circularly swiveled around the hole-machining axis 15 when the guide holding cylinder 17a is rotated. Four of the eccentricity-amount adjusting screws 18 are screwed into the guide holding cylinder 17a separated from each other at 90° in a circular direction. The eccentricity amount of the second guide hole 16a can be adjusted by adjusting a screw amount of the four eccentricity-amount adjusting screws 18.

A motor 17c is fitted to the guide base 19 via a bracket. A pulley 17d is mounted on a motor axis. The pulley 17d and the guide holding cylinder 17a are interlocked with each other by a ring-shaped belt 17e. The guide holding cylinder 17a rotates when the motor 17c is rotated.

The first and second guide holes 14a and 16a are formed in high-hardness mineral ores 14b and 16b such as diamond, ruby, sapphire embedded in lower parts of the first and second guide members 14 and 16 formed by ceramics and the like. The first and second guide holes 14a and 16a are formed to have short lengths of holes, and are approximately in point contact with the thin wire electrode 11. The first and second guide holes 14a and 14b are formed to have internal diameters a few micrometers larger than an external diameter of the thin wire electrode 11. Holes of large internal diameters are formed in the first and second guide members 14 and 16, and an increase of a sliding resistance attributable to a contact of the thin wire electrode 11 with these holes does not occur.

As shown in FIG. 2, a first guide member 114 and a second guide member 116 can be formed in cylindrical shapes having tapered holes by ruby, sapphire, ceramics, or the like, and a first guide hole 114a and a second guide hole 116a can be formed at lower parts.

The eccentricity-amount adjusting unit 18 shown in FIG. 1 can be replaced with an eccentricity-amount adjusting unit 218 shown in FIGS. 3 and 4. The eccentricity-amount adjusting unit 218 includes a guide holding cylinder 217a that rotates concentrically with the first guide hole 14a (the hole-machining axis 15), a cylinder 218a engaged with a circular hole 217f provided in the guide holding cylinder 217a by being eccentric from the hole-machining axis 15 by an eccentricity amount a, and a second guide member 216 engaged with a circular hole 218f provided in the cylinder 218a by being eccentric from a center of the cylinder 218a by the eccentricity amount a.

A second guide hole 216a is provided at a center of the second guide member 216. An eccentricity amount of the second guide hole 216a can be easily adjusted within a range of 0 to 2a by rotating the cylinder 218a by 0° to 180°.

The thin wire electrode 11 is held by the electrode holder 13, falls while rotating, and forms a hole on the workpiece 12 by generating an electric discharge between the lower part 11b and the workpiece 12. When the second guide members 16, 116, and 216 are circularly swiveled relative to the first guide member 14, the lower part 11b of the thin wire electrode 11 is conically swiveled in rotation. The conical inverse-tapered hole 12t having a larger hole diameter on the lower surface 12b than a hole diameter on the workpiece upper surface 12a can be formed on the workpiece 12 by conically swiveling the lower part 11b of the thin wire electrode 11.

A swiveling speed of the second guide members 16, 116, and 216 is explained next. When the swiveling speed of the second guide members 16, 116, and 216 is slow, a downward feed amount during a rotation of the thin wire electrode 11 becomes large, and a spiral trace sometimes remains on an internal wall surface of the inverse-tapered hole 12t after machining. On the other hand, when the swiveling speed is fast, centrifugal force working on the lower part 11b of the thin wire electrode 11 becomes large, and the lower part 11b is bent outward, or machining becomes unstable, or a taper angle of the inverse-tapered hole 12t becomes large.

To avoid leaving a spiral trace on the internal wall surface of the inverse-tapered hole 12t, the second guide members 16, 116, and 216 are swiveled at a rate of one rotation per a downward feed amount of about 0.01 to 0.2 millimeter depending on a diameter of the thin wire electrode 11 used and a pulse condition of a machining power source. The swiveling rotation number is preferably about 3 to 300 rpm considering machining stability and taper angle stability.

A machining example of the inverse-tapered hole 12t by the microhole electric discharge machining apparatus 81 according to the first embodiment is explained next. Machining conditions are shown below.

Thin wire electrode: tungsten electrode: $\phi$=0.05
Workpiece: SUS304: t=0.8 millimeter
Distance between the workpiece upper surface 12a and the first guide hole 14a: 0.4 millimeter Distance between the first guide hole 14a and the second guide hole 16a: 11 millimeters
Peak current of an electric discharge pulse: 5 amperes
Pulse width: 0.2 microsecond
Frequency of an electric discharge pulse: about 20 kilohertz
Machining start point: the workpiece upper surface 12a +0.2 millimeter
Swiveling rotation number of the second guide member 16: 5 rpm
Total swiveling number of times of the second guide member 16: 15 times FIG. 5 to FIG. 7 depict a machining result of an inverse-tapered hole when an eccentricity amount R of the second guide member 16 is 0.1 millimeter, 0.2 millimeter, and 0.3 millimeter, respectively in the above conditions.

The microhole electric discharge machining apparatus 81 according to the first embodiment includes: the second guide member 16 that is arranged between the first guide member 14 and the electrode holder 13 and is provided with the second guide hole 16a through which the thin wire electrode 11 is penetrated at a position eccentric from the hole-machining axis 15; and the swivel driving unit 17 that circularly swivels the second guide member 16 (the second guide hole 16a) around the hole-machining axis 15 and circularly swivels the second guide member 16 around the hole-machining axis 15 in high precision by mechanically holding an intermediate part of the thin wire electrode 11. Therefore, a high-precision inverse-tapered hole can be formed. Because the distance between the first guide hole 14a and the electrode holder 13 does not need to be long, the microhole electric discharge machining apparatus has some advantages that a wasteful length of the thin wire electrode 11 can be short, and the cost of electrodes can be reduced.

Second Embodiment

Figure 8:
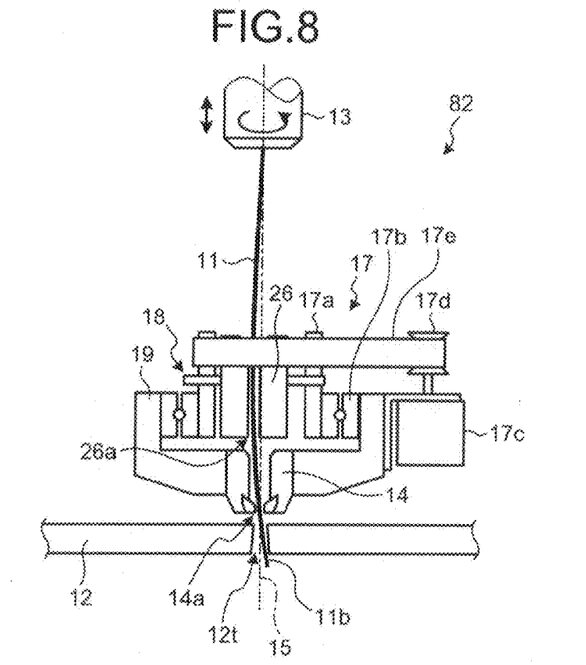
FIG. 8 is a vertical cross-sectional view of a microhole electric discharge machining apparatus according to a second embodiment of the present invention.

FIG. 8 is a vertical cross-sectional view of a microhole electric discharge machining apparatus according to a second embodiment of the present invention. A microhole electric discharge machining apparatus 82 according to the second embodiment is different from the microhole electric discharge machining apparatus 81 according to the first embodiment in that a second guide member 26 is formed in a pillar shape such that the distance between an upper end of the second guide member 26 and a lower end of the electrode holder 13 is shorter than a corresponding distance in the microhole electric discharge machining apparatus 81 according to the first embodiment and that a second guide hole 26a is formed in a linear shape over approximately the total length.

Other portions of the microhole electric discharge machining apparatus 82 according to the second embodiment are not different from those of the microhole electric discharge machining apparatus 81 according to the first embodiment. Because the microhole electric discharge machining apparatus 82 according to the second embodiment has a short distance between the upper end of the second guide member 26 and the lower end of the electrode holder 13, the thin wire electrode 11 is not easily buckled during machining.

Third Embodiment

Figure 9:
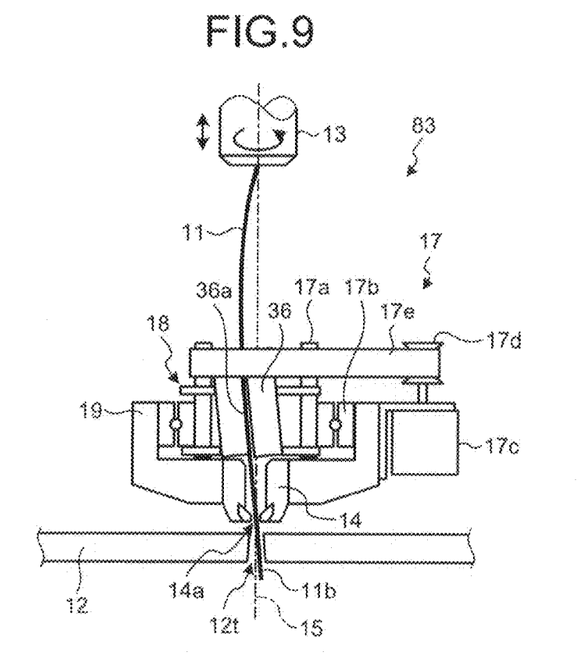
FIG. 9 is a vertical cross-sectional view of a microhole electric discharge machining apparatus according to a third embodiment of the present invention.

FIG. 9 is a vertical cross-sectional view of a microhole electric discharge machining apparatus according to a third embodiment of the present invention. A microhole electric discharge machining apparatus 83 according to the third embodiment is different from the microhole electric discharge machining apparatus 82 according to the second embodiment in that the direction of a second guide hole 36a is inclined to the hole-machining axis 15 at an angle matched with a taper angle of the inverse-tapered hole 12t to be machined such that the second guide hole 36a faces the direction of the first guide hole 14a. An inclination angle of the second guide hole 36a can be adjusted by the eccentricity-amount adjusting units 18. According to the microhole electric discharge machining apparatus 83 of the third embodiment, the eccentricity-amount adjusting units 18 become inclination adjusting units. Other portions of the microhole electric discharge machining apparatus 83 according to the third embodiment are not different from those of the microhole electric discharge machining apparatus 82 according to the second embodiment.

The microhole electric discharge machining apparatus 83 according to the third embodiment has a second guide member 36 formed in a long pillar shape, and has the second guide hole 36a formed linearly over approximately the total length. Further, the direction of the second guide hole 36a is inclined to the hole-machining axis 15 such that the second guide hole 36a faces the direction of the first guide hole 14a, and a portion from an intermediate part of the thin wire electrode 11 to the lower part 11b is extended linearly. Therefore, the inverse-tapered hole 12t in high precision can be formed.

Fourth Embodiment

Figure 10:
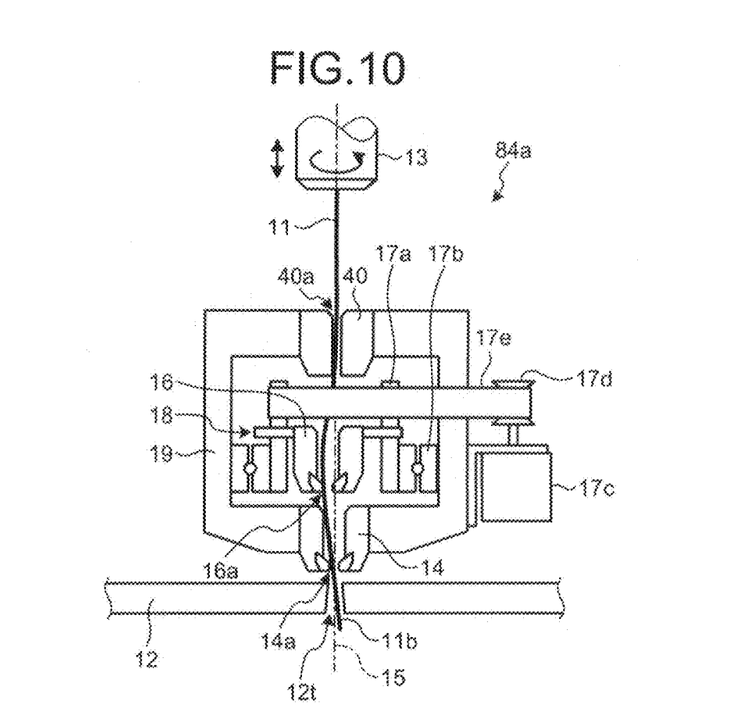
FIG. 10 is a vertical cross-sectional view of a microhole electric discharge machining apparatus according to a fourth embodiment of the present invention.
Figure 11:
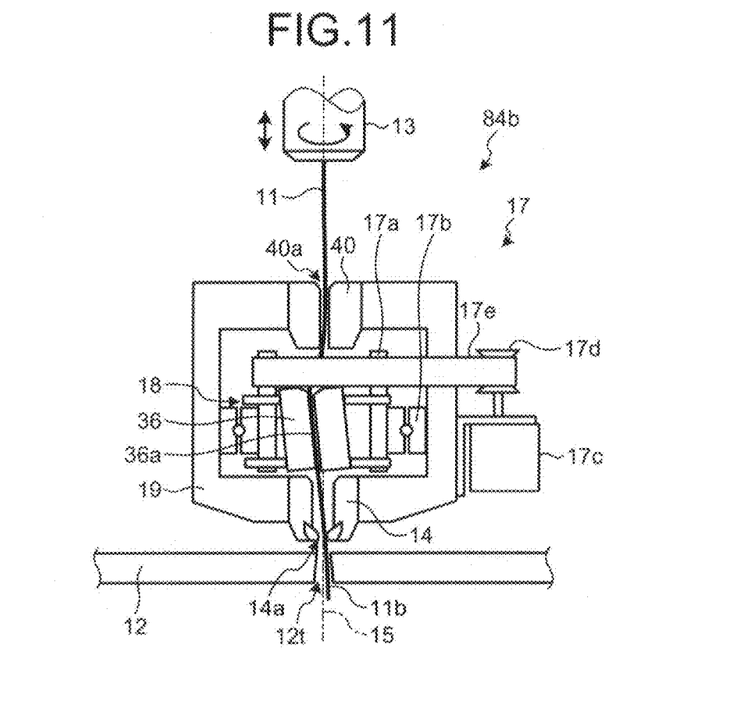
FIG. 11 is a vertical cross-sectional view of a modification of the microhole electric discharge machining apparatus according to the fourth embodiment.

FIG. 10 is a vertical cross-sectional view of a microhole electric discharge machining apparatus according to a fourth embodiment of the present invention, and FIG. 11 is a vertical cross-sectional view of a modification of the microhole electric discharge machining apparatus according to the fourth embodiment. As shown in FIGS. 10 and 11, microhole electric discharge machining apparatuses 84a and 84b according to the fourth embodiment are different from the microhole electric discharge machining apparatuses 81 and 83 according to the first and third embodiments in that a third guide member 40, on which a third guide hole 40a through which the thin wire electrode 11 is penetrated is provided and which is supported by the guide base 19, is provided between the second guide members 16 and 36 and the electrode holder 13.

Other portions of the microhole electric discharge machining apparatuses 84a and 84b according to the fourth embodiment are not different from those of the microhole electric discharge machining apparatuses 81 and 83 according to the first and third embodiments. Because the microhole electric discharge machining apparatuses 84a and 84b according to the fourth embodiment include the third guide member 40 between the second guide members 16 and 36 and the electrode holder 13, the thin wire electrode 11 is not easily buckled.

Fifth Embodiment

Figure 12:
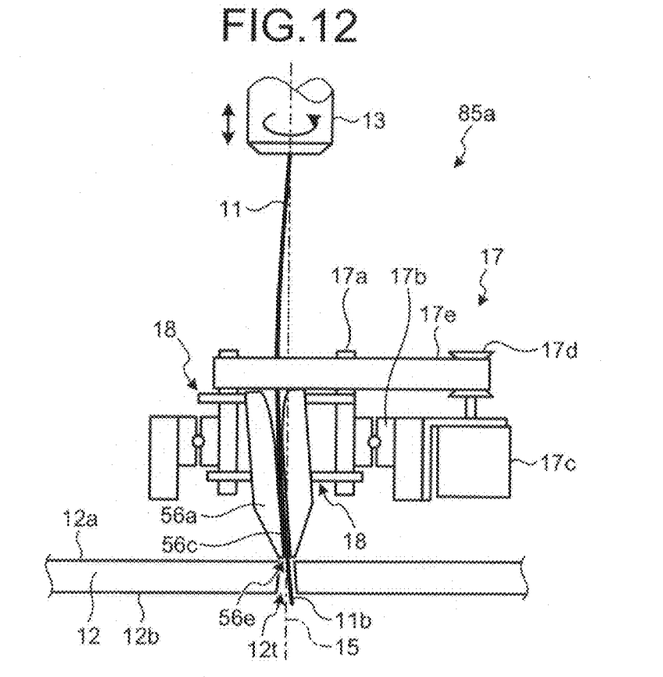
FIG. 12 is a vertical cross-sectional view of a microhole electric discharge machining apparatus according to a fifth embodiment of the present invention.
Figure 13:
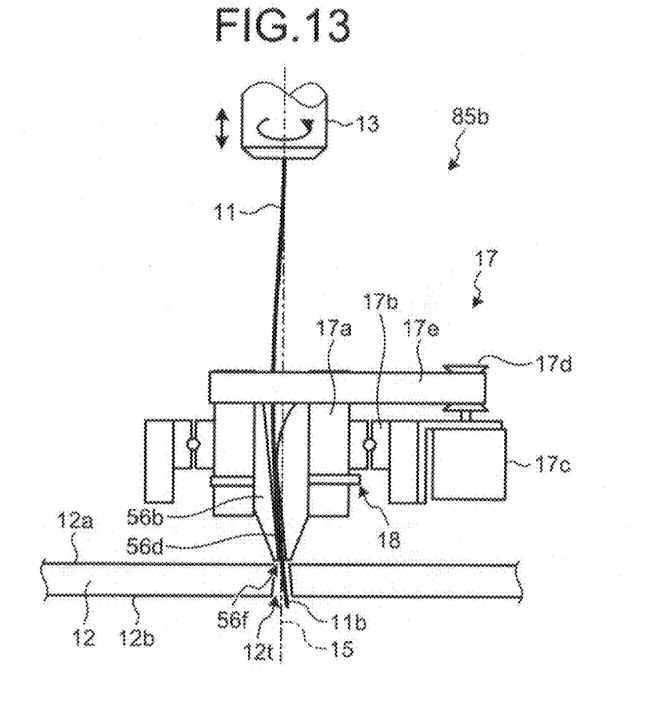
FIG. 13 is a vertical cross-sectional view of a modification of the microhole electric discharge machining apparatus according to the fifth embodiment.

FIG. 12 is a vertical cross-sectional view of a microhole electric discharge machining apparatus according to a fifth embodiment of the present invention, and FIG. 13 is a vertical cross-sectional view of a modification of the microhole electric discharge machining apparatus according to the fifth embodiment. As shown in FIGS. 12 and 13, microhole electric discharge machining apparatuses 85a and 85b according to the fifth embodiment are microhole electric discharge machining apparatuses that form the conical inverse-tapered hole 12t having a larger hole diameter on the lower surface 12b than a hole diameter on the workpiece upper surface 12a on the workpiece 12 by the thin wire electrode 11. The microhole electric discharge machining apparatuses 85a and 85b include: the electrode holder 13 that holds an upper part of the thin wire electrode 11 and feeds the lower part 11b downward to stretch the lower part 11b to the workpiece 12 by rotating the thin wire electrode 11; guide members 56a and 56b having guide-hole lower ends 56e and 56f arranged on the hole-machining axis 15 near the workpiece upper surface 12a and formed with linear guide holes 56c and 56d of which direction is inclined to the hole-machining axis 15 and which have the thin wire electrode 11 penetrated through the guide holes 56c and 56d; and the swivel driving unit 17 that circularly swivels the guide members 56a and 56b around the hole-machining axis 15.

The guide member 56a shown in FIG. 12 is formed in a cylindrical shape having an external diameter smaller than an internal diameter of the guide holding cylinder 17a, and is held in the guide holding cylinder 17a by the eccentricity-amount adjusting units 18. An inclination angle (an inclination amount) of the guide hole 56c to the hole-machining axis 15 can be adjusted by the eccentricity-amount adjusting units 18. According to the microhole electric discharge machining apparatus 85a of the fifth embodiment, the eccentricity-amount adjusting units 18 become inclination adjusting units.

The guide member 56b shown in FIG. 13 is formed such that an external diameter is the same as the internal diameter of the guide holding cylinder 17a and is held in the guide holding cylinder 17a by being fastened by the eccentricity-amount adjusting units 18. The guide member 56b cannot adjust an inclination angle to the hole-machining axis 15.

Because the microhole electric discharge machining apparatuses 85a and 85b according to the fifth embodiment include the guide members 56a and 56b having the guide-hole lower ends 56e and 56f arranged on the hole-machining axis 15 near the workpiece upper surface 12a and formed with the linear guide holes 56c and 56d of which direction is inclined to the hole-machining axis 15 and which have the thin wire electrode 11 penetrated through the guide holes 56c and 56d, the first guide member 14 is not necessary, and the microhole electric discharge machining apparatuses 85a and 85b have simple structures and can form the inverse-tapered hole 12t which is precise.

Sixth Embodiment

Figure 14:
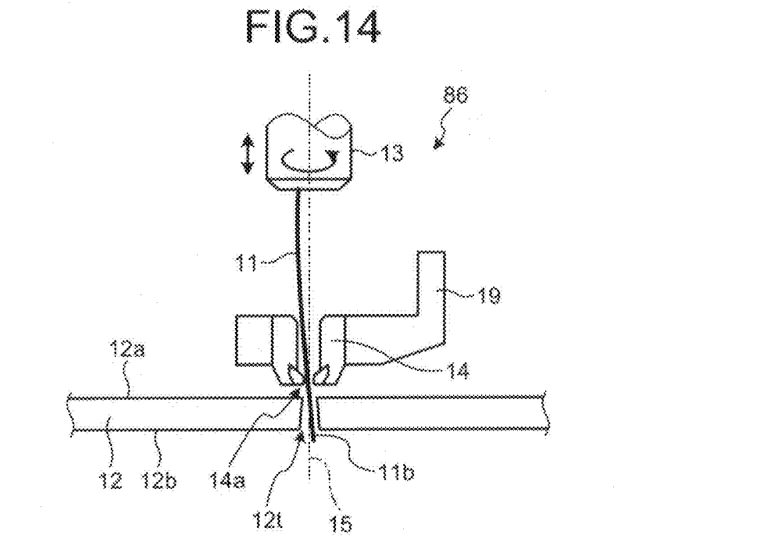
FIG. 14 is a vertical cross-sectional view of a microhole electric discharge machining apparatus according to a sixth embodiment of the present invention.

FIG. 14 is a vertical cross-sectional view of a microhole electric discharge machining apparatus according to a sixth embodiment of the present invention. As shown in FIG. 14, a microhole electric discharge machining apparatus 86 according to the sixth embodiment is a microhole electric discharge machining apparatus that forms the conical inverse-tapered hole 12t having a larger hole diameter on the lower surface 12b than a hole diameter on the workpiece upper surface 12a on the workpiece 12 by the thin wire electrode 11. The microhole electric discharge machining apparatus 86 includes: the electrode holder 13 that holds an upper part of the thin wire electrode 11 by decentering the upper part from a rotation axis (the hole-machining axis 15), and feeds the lower part 11b downward to stretch the lower part 11b to the workpiece 12 by rotating the upper part of the thin wire electrode 11 and by swiveling the upper part around the hole-machining axis 15; and the guide member 14 that is arranged near the workpiece upper surface 12a and is provided with the guide hole 14a through which the thin wire electrode 11 is penetrated on the hole-machining axis 15.

Because the microhole electric discharge machining apparatus 86 according to the sixth embodiment includes the electrode holder 13 that holds the upper part of the thin wire electrode 11 by decentering the upper part from the rotation axis (the hole-machining axis 15), and feeds the lower part 11b downward to stretch the lower part 11b to the workpiece 12 by rotating the upper part of the thin wire electrode 11 and by swiveling the upper part around the hole-machining axis 15, the second guide member 16 is not necessary, and a simple and compact microhole electric discharge machining apparatus can be obtained.

Seventh Embodiment

Figure 15:
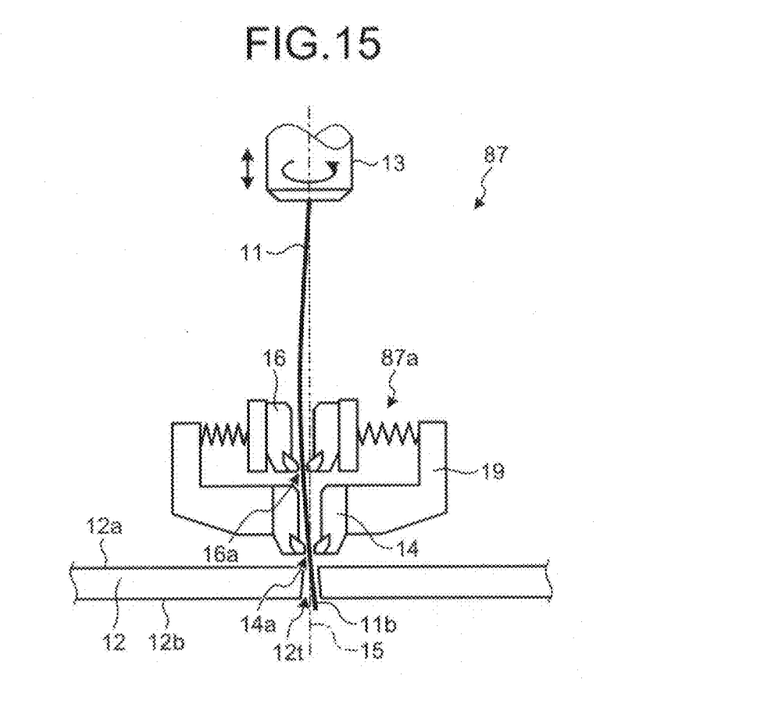
FIG. 15 is a vertical cross-sectional view of a microhole electric discharge machining apparatus according to a seventh embodiment of the present invention.

FIG. 15 is a vertical cross-sectional view of a microhole electric discharge machining apparatus according to a seventh embodiment of the present invention. As shown in FIG. 15, a microhole electric discharge machining apparatus 87 according to the seventh embodiment is a microhole electric discharge machining apparatus that forms the conical inverse-tapered hole 12t having a larger hole diameter on the lower surface 12b than a hole diameter on the workpiece upper surface 12a on the workpiece 12 by the thin wire electrode 11. The microhole electric discharge machining apparatus 87 includes: the electrode holder 13 that holds an upper part of the thin wire electrode 11, and feeds the lower part 11b downward to stretch the lower part 11b to the workpiece 12 by rotating the thin wire electrode 11; the first guide member 14 that is arranged near the workpiece upper surface 12a and is provided with the first guide hole 14a through which the thin wire electrode 11 is penetrated on the hole-machining axis 15; the second guide member 16 that is arranged between the first guide member 14 and the electrode holder 13 and is provided with the second guide hole 16a through which the thin wire electrode 11 is penetrated; and a swivel driving unit 87a that circularly swivels, elliptically swivels, or polygonally swivels the second guide member 16 around the hole-machining axis 15.

The swivel driving unit 87a is an XY-axis driving mechanism, and is configured by an XY-axis driving mechanism of a system having a motor and ball screws combined together or by a piezo XY-axis driving mechanism. The inverse-tapered hole 12t can be formed in an arbitrary shape such as a conical shape, an elliptical conical shape, or a polygonal conical shape by circularly swiveling, elliptically swiveling, or polygonally swiveling the second guide member 16 around the hole-machining axis 15 by the swivel driving unit 87a. Because the swivel driving unit 87a can arbitrarily adjust an amount of eccentricity from the hole-machining axis 15 of the second guide member 16, the inverse-tapered hole 12t can be formed in a trumpet shape (a bell mouth shape) by gradually increasing the eccentricity amount toward a depth of the lower part 11b of the thin wire electrode 11 following a progress of machining of the inverse-tapered hole 12t, for example.

Eighth Embodiment

Figure 16:
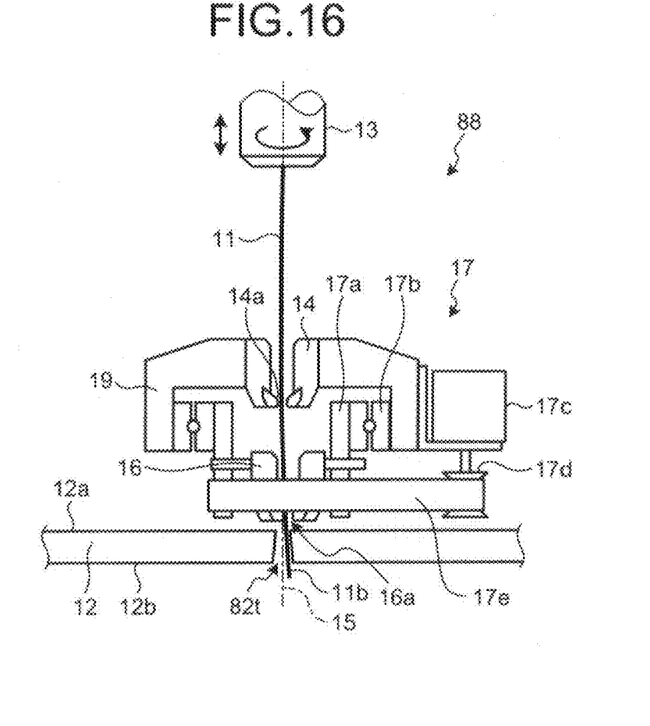
FIG. 16 is a vertical cross-sectional view of a microhole electric discharge machining apparatus according to an eighth embodiment of the present invention.

FIG. 16 is a vertical cross-sectional view of a microhole electric discharge machining apparatus according to an eighth embodiment of the present invention. As shown in FIG. 16, a microhole electric discharge machining apparatus 88 according to the eighth embodiment is a microhole electric discharge machining apparatus that forms a conical inverse-tapered hole 82t having a larger hole diameter on the lower surface 12b than a hole diameter on the workpiece upper surface 12a on the workpiece 12 by the thin wire electrode 11. The microhole electric discharge machining apparatus 88 includes: the electrode holder 13 that holds an upper part of the thin wire electrode and feeds the lower part 11b downward to stretch the lower part 11b to the workpiece 12 by rotating the thin wire electrode 11; the second guide member 16 that is arranged near the workpiece upper surface 12a and is provided with the second guide hole 16a through which the thin wire electrode 11 is penetrated at a position eccentric from the hole-machining axis 15; the first guide member 14 that is arranged between the second guide member 16 and the electrode holder 13, and is provided with the first guide hole 14a through which the thin wire electrode 11 is penetrated on the hole-machining axis 15; and the swivel driving unit 17 that circularly swivels the second guide member 16 around the hole-machining axis 15.

Because the microhole electric discharge machining apparatus 88 according to the eighth embodiment includes: the second guide member 16 that is arranged near the workpiece upper surface 12a and is provided with the second guide hole 16a through which the thin wire electrode 11 is penetrated at a position eccentric from the hole-machining axis 15; and the swivel driving unit 17 that circularly swivels the second guide member 16 around the hole-machining axis 15, the inverse-tapered hole 82t having a larger hole than those in the microhole electric discharge machining apparatuses 81 to 87 according to the first to seventh embodiments can be formed.

INDUSTRIAL APPLICABILITY

As described above, the microhole electric discharge machining apparatus and the electric discharge machining method according to the present invention are useful for machining a high-precision inverse-tapered hole on a workpiece.

The invention claimed is:

1. A microhole electric discharge machining apparatus that forms on a workpiece by a thin wire electrode a conical inverse-tapered hole having a larger hole diameter on a lower surface than a hole diameter on a workpiece upper surface, the microhole electric discharge machining apparatus comprising:
    an electrode holder that is configured to move in upward and downward directions on a hole-machining axis, that holds an upper part of the thin wire electrode, and that feeds a lower part of the thin wire electrode downward to stretch the lower part to the workpiece by rotating the thin wire electrode around the hole-machining axis;
    a first guide member that is arranged near the workpiece upper surface and is provided with a first guide hole through which the thin wire electrode is penetrated on the hole-machining axis;
    a second guide member that is arranged between the first guide member and the electrode holder and is provided with a second guide hole through which the thin wire electrode is penetrated at a position eccentric from the hole-machining axis; and
    a swivel driving unit that circularly swivels the second guide member around the hole-machining axis while maintaining a state where the hole-machining axis is an axis which extends in a same direction through an axis of the electrode holder, an axis of the second guide member, an axis of the first guide member, and an axis of the workpiece.

2. The microhole electric discharge machining apparatus according to claim 1, further comprising an eccentricity-amount adjusting unit that adjusts an amount of eccentricity of the second guide hole from the hole-machining axis.

3. The microhole electric discharge machining apparatus according to claim 1, wherein the second guide member is formed in a pillar shape such that a distance between an upper end of the second guide member and a lower end of the electrode holder becomes short, and the second guide hole is formed linearly over approximately a total length.

4. The microhole electric discharge machining apparatus according to claim 1, further comprising:
   a third guide member having a third guide hole through which the thin wire electrode is penetrated is provided between the second guide member and the electrode holder,
   wherein the swivel driving unit circularly swivels the second guide member around the hole-machining axis while maintaining a state where the hole-machining axis is an axis which extends in a same direction through an axis of the electrode holder, an axis of the third guide member, an axis of the second guide member, an axis of the first guide member, and an axis of the workpiece.

5. A microhole electric discharge machining apparatus that forms on a workpiece by a thin wire electrode a conical inverse-tapered hole having a larger hole diameter on a lower surface than a hole diameter on a workpiece upper surface, the microhole electric discharge machining apparatus comprising:
   an electrode holder that holds an upper part of the thin wire electrode by decentering the upper part from a rotation axis, and feeds a lower part of the thin wire electrode downward to stretch the lower part to the workpiece by rotating the upper part of the thin wire electrode and by swiveling the upper part around a hole-machining axis, so that the upper part of the thin wire electrode exits the electrode holder at a position decentered from the hole-machining axis; and
   a guide member that is arranged near the workpiece upper surface and is provided with a guide hole through which the thin wire electrode is penetrated on the hole-machining axis,
   wherein the thin wire electrode enters the guide hole at a position decentered from the hole-machining axis and exits the guide hole on the hole-machining axis, and
   the electrode holder swivels the upper part around the hole-machining axis while maintaining a state where the hole-machining axis is an axis which extends in a same direction through an axis of the electrode holder, an axis of the guide member, and an axis of the workpiece.

6. A microhole electric discharge machining apparatus that forms on a workpiece by a thin wire electrode a conical inverse-tapered hole having a larger hole diameter on a lower surface than a hole diameter on a workpiece upper surface, the microhole electric discharge machining apparatus comprising:
   an electrode holder that is configured to move in upward and downward directions on a hole-machining axis, that holds an upper part of the thin wire electrode, and that feeds a lower part of the thin wire electrode downward to stretch the lower part to the workpiece by rotating the thin wire electrode around the hole-machining axis;
   a first guide member that is arranged near the workpiece upper surface and is provided with a first guide hole through which the thin wire electrode is penetrated on the hole-machining axis;
   a second guide member that is arranged between the first guide member and the electrode holder and is provided with a second guide hole through which the thin wire electrode is penetrated; and
   a swivel driving unit that circularly swivels, elliptically swivels, or polygonally swivels the second guide member around the hole-machining axis while maintaining a state where the hole-machining axis is an axis which extends in a same direction through an axis of the electrode holder, an axis of the second guide member, an axis of the first guide member, and an axis of the workpiece.

7. A microhole electric discharge machining apparatus that forms on a workpiece by a thin wire electrode a conical inverse-tapered hole having a larger hole diameter on a lower surface than a hole diameter on a workpiece upper surface, the microhole electric discharge machining apparatus comprising:
   an electrode holder that is configured to move in upward and downward directions on a hole-machining axis, that holds an upper part of the thin wire electrode, and that feeds a lower part of the thin wire electrode downward to stretch the lower part to the workpiece by rotating the thin wire electrode around the hole-machining axis;
   a second guide member that is arranged near the workpiece upper surface and is provided with a second guide hole through which the thin wire electrode is penetrated at a position eccentric from the hole-machining axis;
   a first guide member that is arranged between the second guide member and the electrode holder and is provided with a first guide hole through which the thin wire electrode is penetrated on the hole-machining axis; and
   a swivel driving unit that circularly swivels the second guide member around the hole-machining axis while maintaining a state where the hole-machining axis is an axis which extends in a same direction through an axis of the electrode holder, an axis of the first guide member, an axis of the second guide member, and an axis of the workpiece.

8. An electric discharge machining method of forming on a workpiece by a thin wire electrode a conical inverse-tapered hole having a larger hole diameter on a lower surface than a hole diameter on a workpiece upper surface, the method comprising:
   arranging near the workpiece upper surface a first guide member provided with a first guide hole through which the thin wire electrode is penetrated on a hole-machining axis;
   arranging, between the first guide member and an electrode holder that is configured to move in upward and downward directions on the hole-machining axis, a second guide member provided with a second guide hole through which the thin wire electrode is penetrated at a position eccentric from the hole-machining axis;
   feeding a lower part of the thin wire electrode downward to stretch the lower part to the workpiece, so that the electrode holder holds an upper part of the thin wire electrode and makes the thin wire electrode penetrate through the second guide hole and the first guide hole while rotating the thin wire electrode around the hole-machining axis while the second guide member is circularly swiveled around the hole-machining axis; and
   forming the inverse-tapered hole on the workpiece,
   wherein the second guide member is circularly swiveled around the hole-machining axis while maintaining a state where the hole-machining axis is an axis which extends in a same direction through an axis of the electrode holder, an axis of the second guide member, an axis of the first guide member, and an axis of the workpiece.

9. An electric discharge machining method of forming on a workpiece by a thin wire electrode a conical inverse-tapered hole having a larger hole diameter on a lower surface than a hole diameter on a workpiece upper surface, the method comprising:

arranging near the workpiece upper surface a first guide member provided with a first guide hole through which the thin wire electrode is penetrated on a hole-machining axis;

penetrating the thin wire electrode through the first guide hole, and feeding downward by an electrode holder a lower part of the thin wire electrode to stretch the lower part to the workpiece by holding an upper part of the thin wire electrode by decentering the upper part and by swiveling the upper part around the hole-machining axis, so that the upper part of the thin wire electrode exits the electrode holder at a position decentered from the hole-machining axis; and forming the inverse-tapered hole on the workpiece, wherein the thin wire electrode enters the guide hole at a position decentered from the hole-machining axis and exits the guide hole on the hole-machining axis, and the upper part of the thin wire electrode is swiveled around the hole-machining axis while maintaining a state where the hole-machining axis is an axis which extends in a same direction through an axis of the electrode holder, an axis of the guide member, and an axis of the workpiece.

10. An electric discharge machining method of forming on a workpiece by a thin wire electrode a conical inverse-tapered hole having a larger hole diameter on a lower surface than a hole diameter on a workpiece upper surface, the method comprising:

arranging near the workpiece upper surface a first guide member provided with a first guide hole through which the thin wire electrode is penetrated on a hole-machining axis;

arranging, between the first guide member and an electrode holder that is configured to move in upward and downward directions on the hole-machining axis, a second guide member provided with a second guide hole through which the thin wire electrode is penetrated;

feeding a lower part of the thin wire electrode downward to stretch the lower part to the workpiece, so that the electrode holder holds an upper part of the thin wire electrode and makes the thin wire electrode penetrate through the second guide hole and the first guide hole with rotating the thin wire electrode around the hole-machining axis while the second guide member is circularly swiveled, elliptically swiveled, or polygonally swiveled around the hole-machining axis; and forming a circular, elliptical, or polygonal inverse-tapered hole on the workpiece, wherein the second guide member is swiveled around the hole-machining axis while maintaining a state where the hole-machining axis is an axis which extends in a same direction through an axis of the electrode holder, an axis of the second guide member, an axis of the first guide member, and an axis of the workpiece.

11. An electric discharge machining method of forming on a workpiece by a thin wire electrode a conical inverse-tapered hole having a larger hole diameter on a lower surface than a hole diameter on a workpiece upper surface, the method comprising:

arranging near the workpiece upper surface a second guide member provided with a second guide hole through which the thin wire electrode is penetrated at a position eccentric from a hole-machining axis;

arranging, between the second guide member and an electrode holder that is configured to move in upward and downward directions on the hole-machining axis, a first guide member provided with a first guide hole through which the thin wire electrode is penetrated on the hole-machining axis;

feeding a lower part of the thin wire electrode downward to stretch the lower part to the workpiece, so that the electrode holder holds an upper part of the thin wire electrode and makes the thin wire electrode penetrate through the second guide hole and the first guide hole with rotating the thin wire electrode around the hole-machining axis while the second guide member is circularly swiveled around the hole-machining axis; and forming the inverse-tapered hole on the workpiece, wherein the second guide member is swiveled around the hole-machining axis while maintaining a state where the hole-machining axis is an axis which extends in a same direction through an axis of the electrode holder, an axis of the first guide member, an axis of the second guide member, and an axis of the workpiece.

12. The electric discharge machining method according to claim 11, wherein the second guide member is swiveled at a rate of one rotation per a downward feed amount 0.01 millimeter to 0.2 millimeter of the thin wire electrode.

13. The electric discharge machining method according to claim 8, wherein the second guide member is swiveled at a rate of one rotation per a downward feed amount 0.01 millimeter to 0.2 millimeter of the thin wire electrode.

14. The electric discharge machining method according to claim 10, wherein the second guide member is swiveled at a rate of one rotation per a downward feed amount 0.01 millimeter to 0.2 millimeter of the thin wire electrode.

15. The electric discharge machining method according to claim 7, wherein an upper portion of the second guide hole of the second guide member is on the hole-machining axis such that the thin wire electrode is guided from on the hole-machining axis to at the position eccentric from the hole-machining axis.

16. The electric discharge machining method according to claim 11, wherein an upper portion of the second guide hole of the second guide member is on the hole-machining axis such that the thin wire electrode is guided from on the hole-machining axis to at the position eccentric from the hole-machining axis.

17. The microhole electric discharge machining apparatus according to claim 1, wherein a central axis of the second guide hole extends in a same direction as that of the first guide hole.

18. The microhole electric discharge machining apparatus according to claim 1, wherein an exit opening of the second guide hole is misaligned with an entrance opening of the first guide hole.

19. The microhole electric discharge machining apparatus according to claim 1, wherein the thin wire electrode enters the first guide hole at a position decentered from the hole-machining axis and exits the first guide hole on the hole-machining axis.

20. The microhole electric discharge machining apparatus according to claim 1, wherein a wear prevention member is provided in a lower inner wall of each of the first and second guide holes.

21. The microhole electric discharge machining apparatus according to claim 1, wherein a positioning member is provided in a lower inner wall of the first guide hole of the first guide member such that the positioning member guides the wire electrode on a central axis of the first guide hole.

* * * * *